(12) United States Patent
Bender et al.

(10) Patent No.: US 10,762,098 B2
(45) Date of Patent: Sep. 1, 2020

(54) UTILIZING DATABASE TABLES FOR DASHBOARD MANAGEMENT

(71) Applicant: INTERNATIONAL BUSINESS MACHINES CORPORATION, Armonk, NY (US)

(72) Inventors: Michael Bender, Rye Brook, NY (US); Rhonda L. Childress, Austin, TX (US); Donald L. Muchmore, Superior, CO (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 15/671,795

(22) Filed: Aug. 8, 2017

(65) Prior Publication Data

US 2019/0050462 A1  Feb. 14, 2019

(51) Int. Cl.
| | |
|---|---|
| *G06F 17/30* | (2006.01) |
| *G06F 16/248* | (2019.01) |
| *G06F 3/0482* | (2013.01) |
| *G06F 7/08* | (2006.01) |
| *G06F 16/22* | (2019.01) |
| *G06F 16/2455* | (2019.01) |
| *G06F 16/245* | (2019.01) |

(52) U.S. Cl.
CPC .......... *G06F 16/248* (2019.01); *G06F 3/0482* (2013.01); *G06F 7/08* (2013.01); *G06F 16/2282* (2019.01); *G06F 16/245* (2019.01); *G06F 16/24553* (2019.01)

(58) Field of Classification Search
None
See application file for complete search history.

(56) References Cited

U.S. PATENT DOCUMENTS

| | | | |
|---|---|---|---|
| 8,260,764 B1 * | 9/2012 | Gruber | G06F 16/951 707/708 |
| 8,812,551 B2 | 8/2014 | Naick et al. | |
| 2003/0065662 A1 * | 4/2003 | Cosic | G06F 16/252 |
| 2003/0151621 A1 * | 8/2003 | McEvilly | H04N 7/17318 715/744 |
| 2004/0199497 A1 * | 10/2004 | Timmons | G06F 16/951 |
| 2004/0254925 A1 * | 12/2004 | Clough | G06F 3/1204 |
| 2012/0144332 A1 * | 6/2012 | Sola | G06F 8/34 715/769 |
| 2014/0280281 A1 | 9/2014 | Scherer et al. | |
| 2015/0199637 A1 * | 7/2015 | Pfeiffer | G06Q 10/06393 705/7.39 |

(Continued)

*Primary Examiner* — Hung D Le
(74) *Attorney, Agent, or Firm* — Schmeiser, Olsen & Watts; James Nock

(57) ABSTRACT

A method and system is provided to populate a customized pull down menu with table driven sort options in a graphical user interface for displaying a data report. A computer builds a table of sortable fields for a dashboard report, and displays in the dashboard report filters in the table that apply to the sortable fields. The computer receives from the user a selection of at least one sortable field from the sortable fields from a pull down menu, and at least one flag is set for inclusion in the dashboard report, wherein the at least one set flag define a sort order for an element of the data report. A generated SQL statement is modified to sort the element according to the at least one set flag. The element is sorted according to the modified SQL statement.

19 Claims, 11 Drawing Sheets

| | 1 | 2 | 3 | 4 | 5 |
|---|---|---|---|---|---|
| | DASHBOARD NAME | QUERY NAME | REPORT COLUMN NAME | SORT COLUMN NAME | ORDER BY |
| 1 | DBMS_Filter_Design_Test | q_Column_Names_Combo... | Business Type | BUSINESS_TYPE_NM | 0 |
| 2 | DBMS_Filter_Design_Test | q_Column_Names_Combo... | Engagement Lead | ENGAGEMENT_LEAD | 0 |
| 3 | DBMS_Filter_Design_Test | q_Column_Names_Combo... | Engagement Name | ENGAGEMENT_NM | 0 |
| 4 | DBMS_Filter_Design_Test | q_Column_Names_Combo... | ID | ENG_ID | 0 |
| 5 | DBMS_Filter_Design_Test | q_Column_Names_Combo... | Status | PROJECT_STATUS_NM | 0 |
| 6 | DBMS_Filter_Design_Test | q_Column_Names_Combo... | Status Date | STATUS_EFF_DATE | 0 |
| 7 | DBMS_Filter_Design_Test | q_Column_Names_Combo... | Version | VER_ID | 0 |

(56) References Cited

U.S. PATENT DOCUMENTS

| | | | |
|---|---|---|---|
| 2015/0379076 A1 | 12/2015 | Grosse et al. | |
| 2016/0366036 A1* | 12/2016 | Gupta | H04L 67/16 |
| 2018/0096274 A1* | 4/2018 | DeZeeuw | G06F 7/08 |
| 2018/0165724 A1* | 6/2018 | Rakshit | G06F 16/242 |
| 2018/0232227 A1* | 8/2018 | Deol | G06F 8/71 |
| 2019/0034500 A1* | 1/2019 | Das | G06N 5/046 |

* cited by examiner

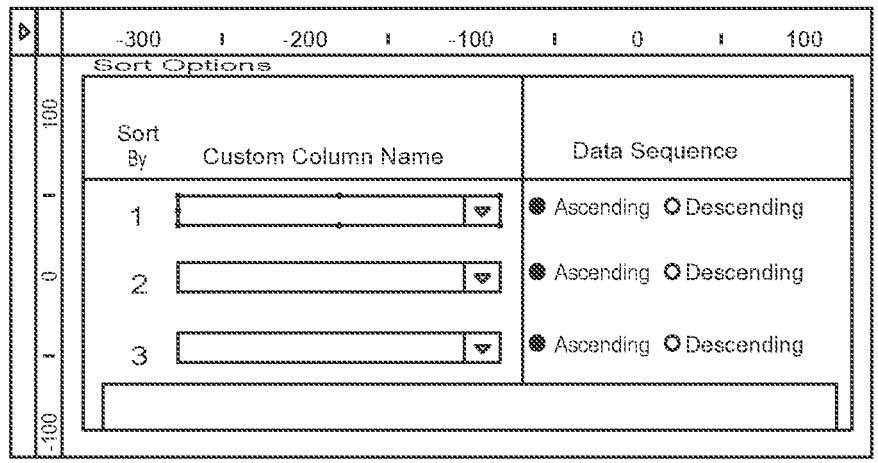

FIG. 6

| Properties ✖ | Events | | |
|---|---|---|---|
| Property | Value | | |
| Name | Sortkey1Combo | | |
| Value | 0 | | |
| OptionList | =field("q_Column_Names_Combo1","COLNAME") | | |
| Location | (+2.885,0.479) | | Business Type |
| ToolTipText | ="Select column to sort" | | Engagement Lead |
| Visible | true | | Engagement Name |
| Enabled | true | | ID |
| Sort | false | | Status |
| Style | DropDownList | | Status Date |
| Width | 2 | | Version |
| Height | 1 | | |
| ▷ Font | Tahoma (10 pt) | | |

FIG. 7

| | 1 | 2 | 3 | 4 | 5 |
|---|---|---|---|---|---|
| | DASHBOARD NAME | QUERY NAME | REPORT COLUMN NAME | SORT COLUMN NAME | ORDER BY |
| 1 | DBMS_Filter_Design_Test | q_Column_Names_Combo... | Business Type | BUSINESS_TYPE_NM | 0 |
| 2 | DBMS_Filter_Design_Test | q_Column_Names_Combo... | Engagement Lead | ENGAGEMENT_LEAD | 0 |
| 3 | DBMS_Filter_Design_Test | q_Column_Names_Combo... | Engagement Name | ENGAGEMENT_NM | 0 |
| 4 | DBMS_Filter_Design_Test | q_Column_Names_Combo... | ID | ENG_ID | 0 |
| 5 | DBMS_Filter_Design_Test | q_Column_Names_Combo... | Status | PROJECT_STATUS_NM | 0 |
| 6 | DBMS_Filter_Design_Test | q_Column_Names_Combo... | Status Date | STATUS_EFF_DATE | 0 |
| 7 | DBMS_Filter_Design_Test | q_Column_Names_Combo... | Version | VER_ID | 0 |

FIG. 8

UTILIZING DATABASE TABLES FOR DASHBOARD MANAGEMENT

TECHNICAL FIELD

The present invention relates to a system and method for creating and generating custom reports over the Internet or an Intranet.

BACKGROUND

Generating custom reports to assist end users in understanding data is a central requirement in many business environments. Storing the appropriate data in computer systems alone does not allow end users to understand the data in a way that will help them make business decisions. To promote effective data analysis, reports are developed to display the data in a configuration that can be understood by the business users.

The requirements for the reports that are needed by the business units are dictated by the business users. However, in many reporting systems, the actual development or programming of the reports is too complex for the business users, who are generally non-technical users. Thus, the task falls to report developers, who are information technology specialists, not specialists in the particular business area of the business user,to generate the reports needed by each business unit.

While the report developers are not familiar with the business, the business users are not familiar with the technology infrastructure. Often, there is lost productivity when these two groups communicate, which can result in inefficiencies in the business process.

In most organizations, the personnel in the Information Technology department, who are qualified to program reports is far outnumbered by the business users. Thus, reporting needs of business users cannot always be met promptly. Information Technology personnel may also attempt to consolidate reporting requests made by non-technical personnel in order to reduce the workload. Although creating a report that can be used by more than one business unit is desirable, sometimes the specifics that each business user may prefer must be sacrificed. So although the reporting request can be filled faster, the end result may not be ideal for any of those people that will use the report.

SUMMARY

A method and system is provided to populate a customized pull down menu with table driven sort options in a graphical user interface for displaying a data report. A computer builds a table of sortable fields for a dashboard report, and displays in the dashboard report filters in the table that apply to the sortable fields. The computer receives from a user a selection of at least one sortable field from the sortable fields from a pull down menu, and at least one flag is set for inclusion in the dashboard report, wherein the at least one set flag define a sort order for an element of the data report. A generated SQL statement is modified by the computer to sort the element according to the at least one set flag. The element is sorted according to the modified SQL statement.

BRIEF DESCRIPTION OF DRAWINGS

FIG. 6 illustrates a sort options box in accordance with an embodiment of the present invention.

FIG. 7 provides an example of a mechanism to establish the properties of the dropdown list in accordance with an embodiment of the present invention.

FIG. 8 illustrates an example of the Custom Sort Options table showing the dashboard name, the query name, the report column, the sort column name, and the order by column in accordance with an embodiment of the present invention.

DETAILED DESCRIPTION

Figure 1:
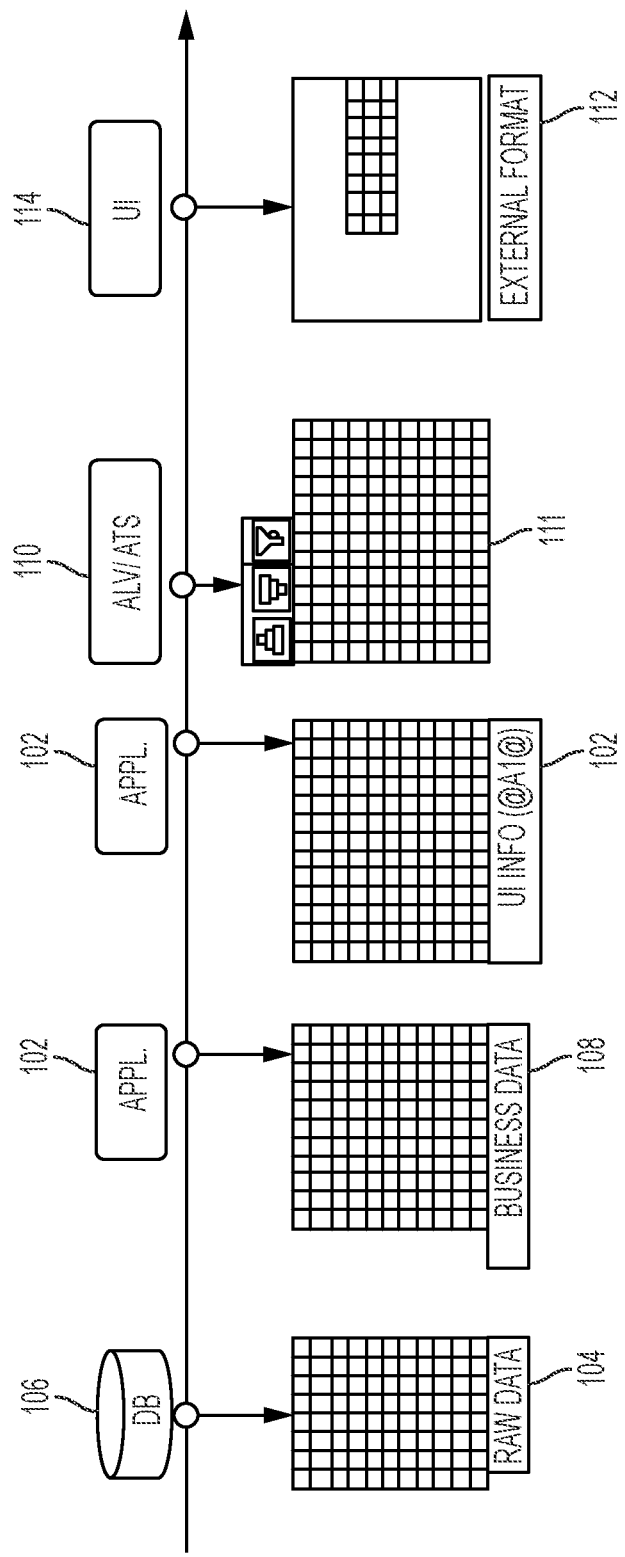
FIG. 1 is a process flow diagram illustrating a conventional approach to displaying data using a list viewer tool in accordance with the prior art.

FIG. 1 is a process flow diagram illustrating a conventional approach to displaying data using a list viewer tool and, more specifically, illustrates a conventional approach to displaying data using a list viewer tool such as ALV. In the conventional approach, an application 102 performs authorization checks on each row of data 104 in a database 106, and extracts relevant data to an internal table 108. Business data, such as calculated fields, is added to the contents of the internal table 108. UI information (icons, links, etc.) is also added by the application 102. The internal table is passed to list viewer/table selection (ALV/ATS) services 110, which manipulate the data 111 according to user requirements. Finally, the required data is displayed according to an external format 112 on the UI 114.

For an end-user, working with huge amounts of data (i.e., millions of records) is often cumbersome and time-consuming. Sorting, filtering, aggregating or searching data could take an extremely long time. Behind the scenes, UI table controls like SAP's GUI ALV required all the data to be first loaded into an internal table in order to be displayed, and table operations such as sorting, filtering or aggregation are executed on the internal table. This approach was both time- and memory-consuming for such large amounts of data.

Functions such as sorting can be further complicated based on how data is to be displayed, or whether a conversion is required. For instance, sometimes data is encoded, and needs to be converted from information to a representative code, or vice versa. Codes, as well as icons or other graphics, can sometimes carry special semantics, and proper sorting of codes and icons requires an explicitly given sequence. Or, a display of numerical values such as time or currency may or may not require decimal positions or the precision to the second, respectively.

Filtering, too, has challenges. Comparison operators, i.e. "less/greater than," as a filter condition make the function much more complex. Filtering by date and/or timestamp can be difficult depending on how data is stored or represented in the database. For instance, many different formats exist for representing a date, and sometimes all of these formats must be considered for proper filtering or other functions.

A reporting system and method is needed that guards the efficiency of the technology infrastructure from the non-technical business user, but still allows this non-technical business user to access reports with enough flexibility that every change request does not necessitate the involvement of a professional report developer.

The present invention involves an Internet-based reporting system or a report generation tool that resides on a computing device and method to populate a customized menu with table driven sort option in a graphical user interface (GUI). Customers for data reports want to be able to modify sort options in business or other industry terms from standard reporting tools. Specifically, customers desire a system and method to state which fields can be sorted, to state which sections of a report the sort may take place, and to state metadata about the column a consumer would be able to understand. Additionally, the system and method of this invention propose a solution where master reporting data may be integrated into the reporting solution directly.

The present invention allows for the tagging of the sort capabilities in a database table. The table may be loaded with capabilities for different dashboards and different queries within a dashboard. The table may be read by a graphical object that will contain all the fields that can be sorted for a given section of a report. The table may map the contents of the selected field to the field named in the underlying query to utilize the database manager to sort the data as the manager produces the result set.

In an embodiment, the sort options would cross reference data element names with values to a report in which the sort options were included, whereby the embodiment would allow for the options to be displayed in a pre-defined order, alphabetically, or a combination of the two. In another embodiment, the system and method integrates the tables to the sort options so that reporting tools would provide the results in the correct order by generating modified SQL code.

For example, one may design a table called CUSTOM_SORT_OPTIONS. This table may be used within various dashboards to provide 'user friendly' column names for drop down lists that are tied to the internal column names needed for sorting result sets. The user may have the option of specifying the order for the column names to display in a drop down list or just default to alphabetic order, or a combination of both. Specific queries may be provided to obtain Report_Column_Name from the Custom_Sort_Options table as will be discussed in more detail below.

Embodiments of the present invention may provide the following benefits not achieved by the prior art; namely, the end-user does not have to know internal column names needed for sort options; the end-user may control the order of the columns displayed in a dropdown based on business knowledge; any additions, changes, removal of pull-down list entries is table driven and requires little or no coding changes. For conventional dropdown lists, data order is controlled by an attribute of the dropdown list and the end-user has little input or control. It is noted that some embodiments of the present invention may not provide all of the foregoing advantages and these potential advantages are not necessarily required of all embodiments.

In general, different users have different capabilities and skills. A first user may have an understanding of the architecture of the database and how to join tables efficiently and write stored procedures that will later be accessed by reports. A second user may have an understanding of the business reason for reporting on the data as well as the elements or specifications of the reports that will be needed by the end user. The second user does not need to understand the database, including low level database structural features, like how tables are linked, and which set of tables are required to return the logically connected data elements associated with a report. A third user may be a business user who will be accessing reports in order to make business decisions. No technical knowledge or understanding of databases is required to be a user of the third type, who may include, but are not limited to, internal non-technical business users and external clients of a service provider that is supplying reports to customers over the Internet.

Figure 2:
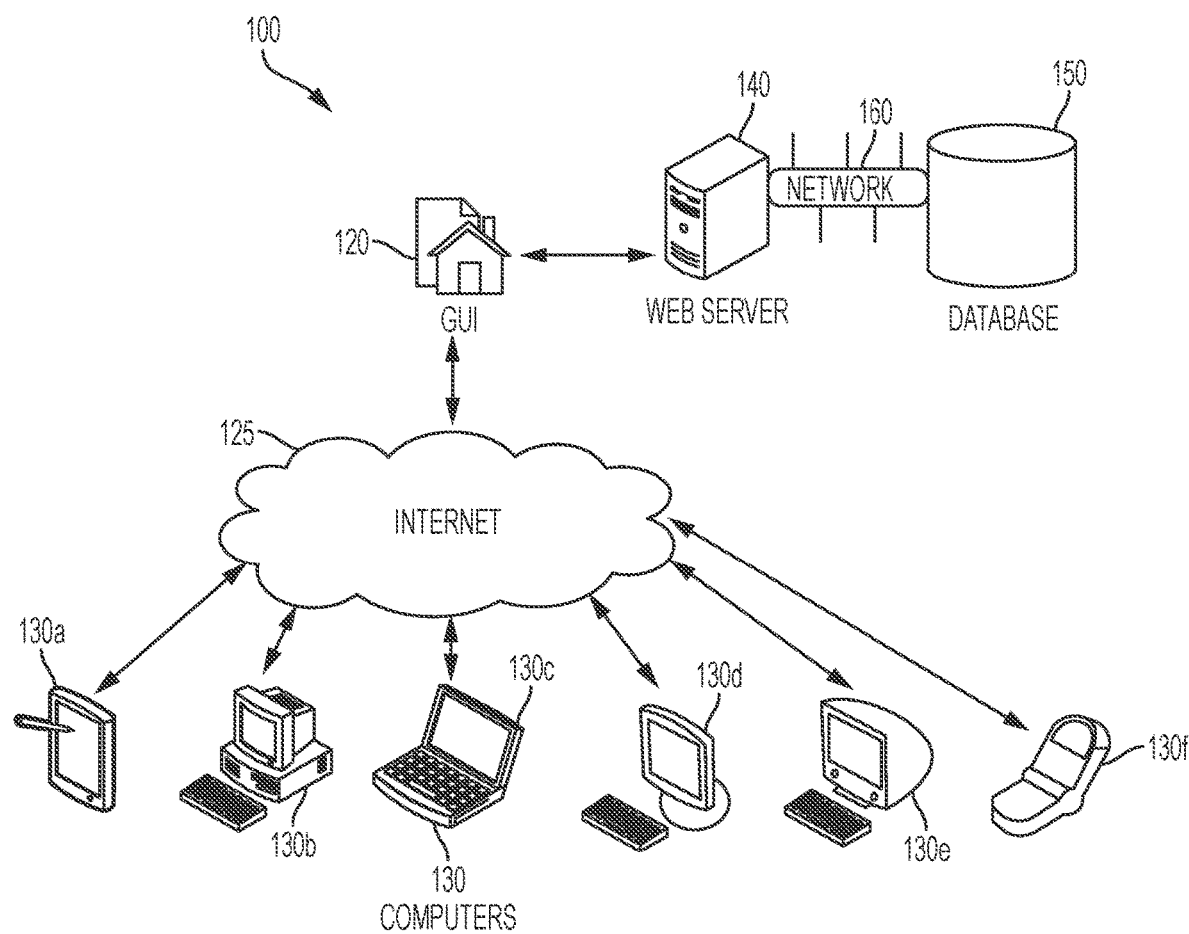
FIG. 2 depicts a technical architecture, according to an embodiment of the present invention.

FIG. 2 depicts a technical architecture, according to an embodiment of the present invention. Referring to FIG. 2, the technical architecture 100 of an embodiment of the claimed system used to practice the method of the invention includes a graphical user interface ("GUI") 120, that can be accessed over at Internet connection 125 at a user terminal 130. User terminals 130a-e include, but are not limited to, data terminals, workstations, portable computers, and/or smart phones. The user terminal 130 interacts over the Internet 125 with a web server 140. The web server 140 serves the GUI 120 to the user at the user terminal 130. The web server 140 pulls the data visible through the GUI 120, the front end of the application, from a database 150, the back end of the application, over a network connection 160. In one embodiment, the GUI 120 is a standard Web Browser so no specialized software must be installed on the user terminal 130 to access the reporting system software. However, any form of Web Browser or web connection can be used. The database 150 may be a relational database as will be understood by those of skill in the art.

Users may design, customize, and generate reports in a large variety of settings and with a variety of user terminals 130a-f. A user may access reports using mobile devices, including but not limited to, a handheld device 130a, and/or a laptop computer 130c, and/or a smartphone 130f. Through these devices, a user could quickly pull up a report in a situation, like an off-site meeting, when data is needed quickly and a trip onsite would waste time and break the workflow of the meeting. Desktop computers 130b, 130d, 130e, although personal computers would all be able to access reports with equal success because the reports are deployed through a standard Web Browser, so no additional customization of the application is necessary on the client side.

A user can access the Internet 125 and view and interact with the GUI 120 on a variety of different user terminals 130a-f. The user terminals 130a-f in FIG. 2 are suggestions and are not meant to be all inclusive. A person of ordinary skill in the art will recognize that GUI 120 can be accessed from any user terminals that access the Internet.

Figure 3:
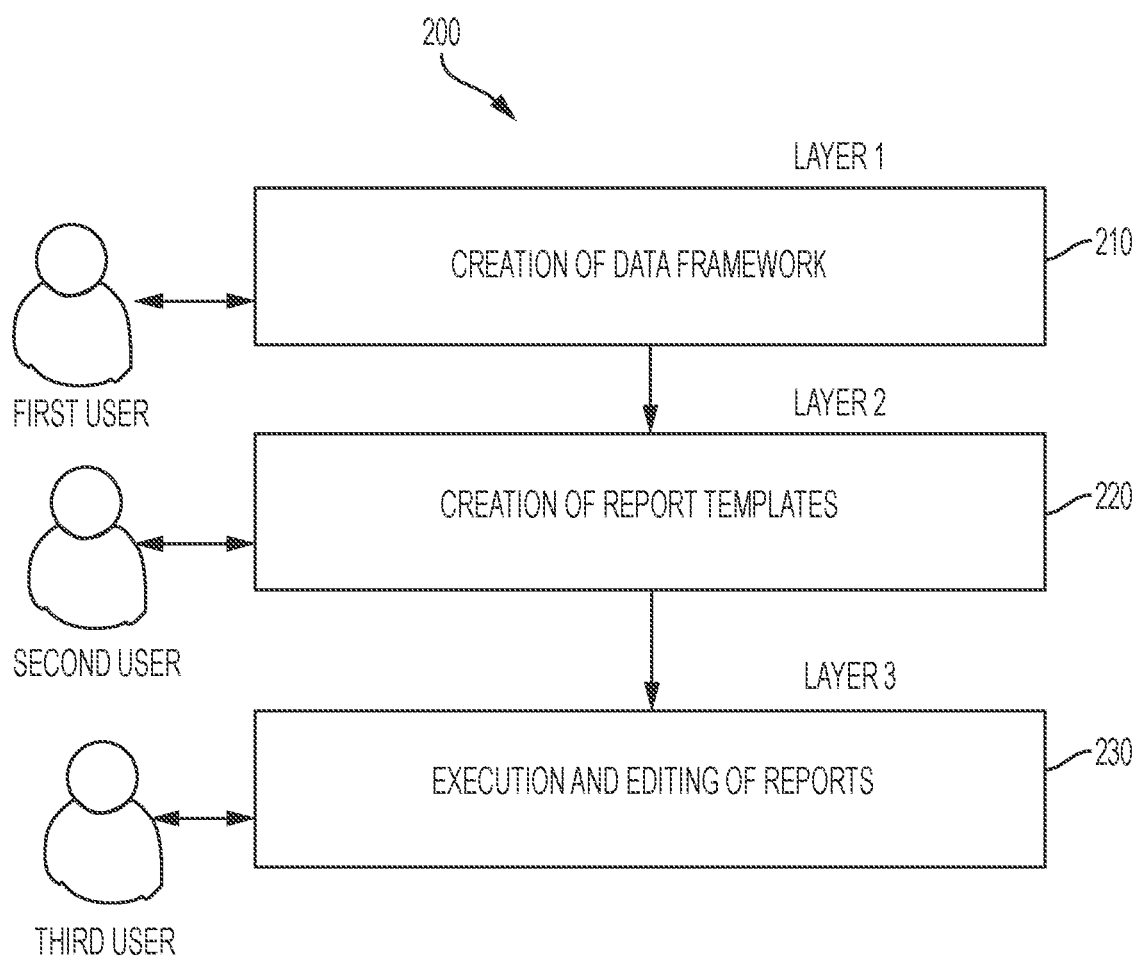
FIG. 3 depicts the interfaces and functionality of data reporting according to an embodiment of the present invention.

FIG. 3 depicts the interfaces and functionality of data reporting according to an embodiment of the present invention. Referring to FIG. 3, each type of user accesses a different "layer" of the system over the Internet, through a GUI 200. The functionality of each layer is displayed in the GUI 200 in accordance with the user skill level.

In a three layer embodiment of the invention, in the first layer 210, the first user accesses functionality that allows this user to create a data framework. In the second layer 220, the second user accesses functionality that allowed this user to develop report templates by accessing the data framework created by the first user. In the third layer 230, the third user accesses functionality that allows this user to execute and edit the report templates created by the second user. The schematic of FIG. 3 is presented only as an example of how takes and functions may be performed in general and are not intended to limited or define the present invention. For example, a single user may perform all functions specified by layers 1-3.

Figure 4:
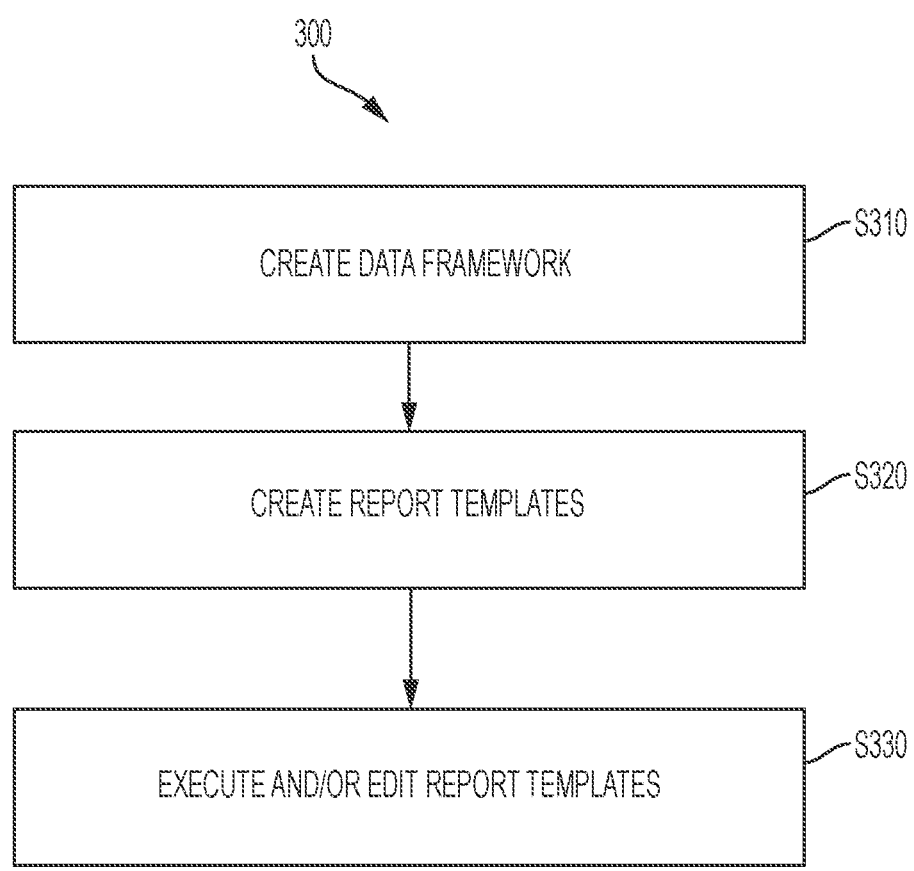
FIG. 4 depicts the data report workflow according to an exemplary embodiment of the present invention.

FIG. 4 depicts the data report workflow according to an exemplary embodiment of the present invention. First, the first user may create a data framework (S310). Next, the second user may design and develop report templates (S320). Finally, the third user may execute and/or edit the report templates to customize the report (S330). Again, this example is provided only as a mechanism to differentiate task performed in relation to the present invention. A single user may perform all of these functions.

Creating a data framework is a technically difficult task. The data that a business user requires in a given report may be stored in many different database tables and may also require manipulations, including but not limited to, calculations and complex SQL queries to produce a useable report. A business user may not have the technical knowledge to create efficient joins or code the efficient and correct stored procedures necessary to develop reports.

A user, who understands the database structure and the data dictionary, uses the GUI on the first layer 210 to manipulate the data in the database into a data set or report category. A data set can be understood as a subdivision of the entire database. Rather than contain all the fields in the database, this data set would only contain the fields relevant to a given report category. In addition to fields, the data set can also contain calculations that a business user may wish to see in reports in a given report category. Some fields that a business user would desire in a report may have values that are stored in fields of the database. Some desired fields or values may not actually be stored on in the back-end database as fields but can be derived through a calculation or data translation or transformation.

A user produces the framework in the first layer by creating data objects, including but not limited to database views and stored procedures as well as queries that may access views and stored procedures. A user can isolate different types of data into sets that will be useful depending upon the type of reports that are required by the business users.

Data groupings that the user creates through the first layer 210 (S310) include but are not limited to: report categories, sub-reports, special criteria, and executable code.

Report Categories are sets of logically linked tables that are displayed through the GUI used by the user as top level reporting units. The fields in the columns that the user pulls into each report category have a one-to-one relationship. For example, a database may contain information about the employees in a given company. The fields in a table of employee names would have a one-to-one relationship with the fields in a table of work email addresses for these employees, i.e., one work email address would exist for each employee name. The definition of a Report Category includes defining the manner by which the tables are linked.

The fields that are selected by the user for inclusion in the Report Categories are the fields that will be available for inclusion in reports that are designed in the next layer of the invention. The user may rank the fields to delineate their importance in a report. If the user makes these designations, the rankings can be viewed by other users on the next level. In this manner, the user can communicate with the other users regarding report development, using the system as a medium.

Sub-Reports are sets of logically linked tables, each of which has a many to one relationship to the report category or categories to which the sub-report might be attached. For example, in a database containing information about employees in a given office, the fields in a table of employee names may have a one to many relationships with the fields in a table of employee phone numbers, i.e., each employee could have multiple numbers including home, work, fax, and cell phone number. The definition of a sub-report includes the links among the tables.

The user may assign sub-reports to a reporting category. Once this association is made, the sub-report can appear as an option to a user designing a new report in the associated report category. A sub-report is similar to a reporting category because the sub-report will also be configured to contain a group of fields or values that can be selected for inclusion in a report during the design phase.

Code is sometimes required to adjust the data in a report category or and/or a sub-report so the data is more user-friendly when viewed in that report. Code which needs to be executed after running a report on a specified report category or sub-report (typically for cleanup) can also be associated to the report category or child report. For example, if the back end of the system is a SQLServer or Oracle database, code is often executed on fields that contain dates in order to display these dates in a user-friendly format. A well designed category and/or sub-report will link to the reference tables necessary to present the data intelligibly to end users.

Special Criteria are filters which might be applied to each report category that require logic more extensive than simple operations on the values from a single field in a report category or a sub-report. For example, a report organized based on a company level report category on data in a multi-company accounting system might have a special criterion to return companies where cash flow in the last quarter was less than 80% of the average for the 4 quarters prior to that.

Executable Code is additional code required to obtain or correct the data in a report category. If any code needs to be executed prior to running a report to make the data available, which will be used by reports on a report category or related sub-reports, that code can be linked to the appropriate category or child report. Certain data may only be available if code is executed before the report is run. For example, a company runs internal contests among salespeople and the winner is the person whose sales generated the largest gross margin. Gross margin for each salesperson can be calculated by a stored procedure which sums the margin at the time of the sale (since margin might vary over time) on each product sold times the number of units sold. The margin data is stored in the database for each product and time period and is not directly associated with orders. Code executed before a report may be necessary to translate the values in certain fields into information that is understood by the end user. Sometimes the data stored in a database table is stored as a code that will not make sense to the business user in a report. For example, the office locations of employees in a company may appear in a table called Employees as numbers that coordinate to each office location. Another table in the database called Offices will contain the numbers that appear in the Employees table and their mappings to the actual names of the offices. An employee in office 1 could actually mean an employee in New York. For the employee location to appear as "New York" instead of "1" in a report, code must be executed to translate the data.

Complex data formatting, including but not limited to creating display addresses, will normally be done by pre-processing code. Code may be required to be executed after a report is run as well. In one embodiment, post-processing code is run to delete any temporary tables in the database that were required to create the report.

A Report Templates is a basic report that can be tailored by a business user or used without any changes. For example, a report template for a sales report may list the salesperson, the office location of this person, the title of the person, the number of sales each quarter, and the commissions paid on those sales. A business user who accesses this report may wish to see something more specific than the template, such as only the sales for a given period and for a given office location. The business user can customize the template in the third layer.

When the user accesses a GUI 120, all objects that were created by the user (S310) are visible and available to other users. The user can select the data objects in the data framework to create report templates (S320).

Figure 5:
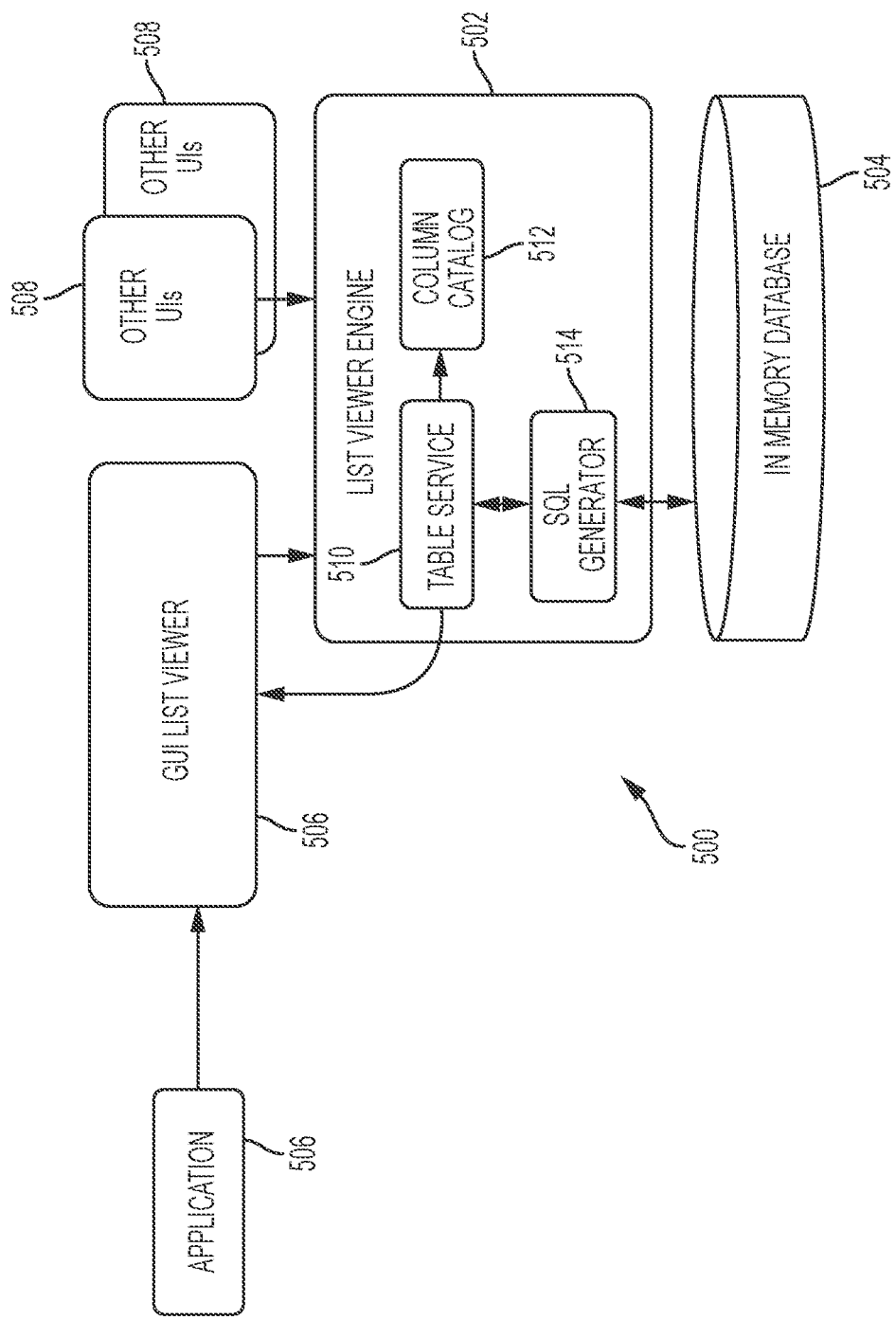
FIG. 5 is a block diagram of a database system employing a list viewer engine according to an embodiment of the present invention.

FIG. 5 is a block diagram of a database system employing a list viewer engine according to an embodiment of the present invention. For example, FIG. 5 illustrates a list viewer engine 502 for a database system 500. The list viewer engine 502 processes requests from an application 506 for data on a database 504 for eventual display on a graphical user interface (GUI) list viewer 506 or other UI 508. The list viewer engine 502 interfaces directly with the database 504, such as an in-memory database. The list viewer engine 502 includes a table service 510 and a column catalog 512 for restricting requests from the application 506, and an SQL generator 514, which maps each restructured request to an API in the database 504.

The table service 510 performs various services for the SQL generator 514 such as paging and grouping of inputs into a single SQL statement. More specifically, the table service 510 includes user-specified filters from a selection screen in the GUI as provided by the application 506, as well as application specified filters. The table service 510 includes authorization-based restrictions and additional ad-hoc filters. The table service 510 defines sort order, visible rows and/or columns, grouping, aggregation, and lead selection of the data to be displayed in the GUI 506.

The column catalog 512 is configured to translate rules (i.e. sort, filter, grouping, aggregation) into a database request, while considering the formatting options used by the UI 508. Additionally, the column catalog 512 translates a user-specified filter and sort into a database language used by the database 504. Examples of the filter and sort requirements include requesting a time to be displayed without seconds, or amounts grouped by currencies. The column catalog 512 translates codes into descriptions, and vice versa, and ensures that search requests are executed case-insensitively where necessary. Accordingly, the column catalog 512 is configured to handle processing down at the database 504 which had previously been executed by the application 506.

According to the present invention, the table service 510 works with the SQL generator 514 to develop and process user defined sorting option and requests which are ultimately delivered to the GUI List viewer 506 in the manner described below.

As previously mentioned, the present invention provides a system and method to populate a customized pull-down menu with table driven sort options in a software GUI. The sort options may cross-reference data element names with values to a report in which the sort options were included. The sort options may be displayed in a number of orders; e.g., predefined order, alphabetical order, or a combination of both. The system may integrate the tables to the sort options so that reporting tools would provide the result in the prescribed order by generating a modified SQL code.

According to one aspect of the invention, the table is formed from the "dashboard_name", the "query_name", and the "report_column_name". The fourth field, "sort_column_name", is the column name to be used for sorting, and the fifth column, "order_by", specifies the order that the report column name should be listed in the drop down list. It is noted that date and time stamp columns may also be defined for normal auditing tracking of changes.

The query to obtain the Report_Column_Name from the Custom_Sort_Options table is provided below as the SQL defined in q_Column_Names_Combo1.

Select Report_Column_Name as colname,
   Order_By as customorderby
From DSTRPT.CUSTOM_SORT_OPTIONS
Where Dashboard_Name=&ThisDashboardName
And Query_Name=&ThisQueryName
Order By customorderby asc, colname asc One may obtain the "report_column_name" using ThisDashboardName and ThisQueryName which are global variables defined within the dashboard. The result set is sorted by the "Order_By" column asc and "report_column_name" asc. This list supports a user friendly column of names shown in the drop down list box.

FIG. 6 illustrates a sort options box in accordance with an embodiment of the present invention. When pressed, a sort options box is displayed with a drop down list of user-friendly column names associated with the headings in a result set or table layout. A user can also specify the sort sequence as ascending or descending. The user friendly column names selected by the user on the sort options box may be used to cross-reference the CUSTOM_SORT_OPTIONS table to obtain the column name (e.g., sort column name) that will be used in substitution variables in SQL drive and/or specify the sort fields for the result set.

FIG. 7 provides an example of a mechanism to establish the properties of the dropdown list in accordance with an embodiment of the present invention. More specifically, FIG. 7 provides an example in one reporting package, i.e., QMF™ for Windows®, to establish the properties of the dropdown list. FIG. 7 illustrates examples of the properties and values to defined the dropdown list in a manner that will be understood by those of skill in the art. The value for the "Name" property is Sortkey1Combo and the value for the "OptionList" property is =field(*q_Column_Names_Combo1","COLNAME") with the column names being listed as shown in FIG. 7.

FIG. 8 illustrates an example of the Custom Sort Options table showing the dashboard name, the query name, the report column, the sort column name, and the order by column in accordance with an embodiment of the present invention. The Custom Sort Options table may appear as shown in FIG. 8 showing the dashboard name (e.g., DEMS_Filter_Design_Test) as column 1; the query name as column 2; the report column name as column 3, the sort column name as column 4 and the order by column a column 5.

The main query to obtain data for display is provided by the following language.

```
WHERE E.ENGAGEMENT_ID = E.ENGAGEMENT_ID
&g_EngID_SQLComment AND E.ENGAGEMENT_ID =
&g_Eng_ID_sea
--Engagement ID Search
&g_EngName_SQLComment AND &g_Engagement_NM_NOT
E.ENGAGEMENT_NM LIKE "%" || &g_Eng_Name_search || "%"
Engagement Name Search
&g_EngLead_SQLComment AND &g_Engagement_Lead_NOT
ENG_LEAD.NOTES_MAIL_ID IN (&g_EngLead_Choice)
Engagement Lead
&g_Business_Type_SQLComment AND
BT.BUSINESS_TYPE_NM = &g_Business_Type_Choice
Business Type
&g_Project_Status_SQLComment AND &g_Project_Status_NOT
PS.PROJECT_STATUS_NM IN (&g_Project_Status_Choice)
Version Status
-- sort columns and sequence
```

-continued

```
&g_SortKey1SQLComment Order By &g_SortKey1 &g_SortSeq1
&g_SortKey2SQLComment , &g_SortKey2 &g_SortSeq2
&g_SortKey3SQLcomment , &g_SortKey3 &g_SortSeq3
```

For the foregoing query, all variables with & are substitution variable sets based on filters and sort options made by the user. It will be understood by those of skill in the art that various changes may be made without departing from the scope of the invention.

Employing the foregoing drop down list and custom sort options, the present invention provides a method and system for modifying sort options for data terms in business and other data reporting tools. By way of example, the process described above may provide a wide variety of data manipulation technique including sort options. Different examples of data manipulation are listed below with the first example showing column names sorted alphabetically, by a user-designated number order, and a combination of both.

Example 1

| | 1 DASHBOARD NAME | 2 QUERY NAME | 3 REPORT COLUMN NAME | 4 SORT COLUMN NAME | 5 ORDER BY |
|---|---|---|---|---|---|
| 1 | DEMS_Filter_Design_Test | q_Column_Names_Combo | Business Type | BUSINESS_TYPE_NM | 0 |
| 2 | DEMS_Filter_Design_Test | q_Column_Names_Combo | Engagement Lead | ENGAGEMENT_LEAD | 0 |
| 3 | DEMS_Filter_Design_Test | q_Column_Names_Combo | Engagement Name | ENGAGEMENT_NM | 0 |
| 4 | DEMS_Filter_Design_Test | q_Column_Names_Combo | ID | ENG_ID | 0 |
| 5 | DEMS_Filter_Design_Test | q_Column_Names_Combo | Status | PROJECT_STATUS_NM | 0 |
| 6 | DEMS_Filter_Design_Test | q_Column_Names_Combo | Status Date | STATUS_EFF_DATE | 0 |
| 7 | DEMS_Filter_Design_Test | q_Column_Names_Combo | Version | VER_ID | 0 |

Order of Columns in DropDown List (Combination)

Business Type
Engagement Lead
Engagement Name
ID
Status
Status Date
Version

Example 2

| | 1 DASHBOARD NAME | 2 QUERY NAME | 3 REPORT COLUMN NAME | 4 SORT COLUMN NAME | 5 ORDER BY |
|---|---|---|---|---|---|
| 1 | DEMS_Filter_Design_Test | q_Column_Names_Combo | Business Type | BUSINESS_TYPE_NM | 2 |
| 2 | DEMS_Filter_Design_Test | q_Column_Names_Combo | Engagement Lead | ENGAGEMENT_LEAD | 1 |
| 3 | DEMS_Filter_Design_Test | q_Column_Names_Combo | Engagement Name | ENGAGEMENT_NM | 3 |
| 4 | DEMS_Filter_Design_Test | q_Column_Names_Combo | ID | ENG_ID | 6 |
| 5 | DEMS_Filter_Design_Test | q_Column_Names_Combo | Status | PROJECT_STATUS_NM | 4 |
| 6 | DEMS_Filter_Design_Test | q_Column_Names_Combo | Status Date | STATUS_EFF_DATE | 5 |
| 7 | DEMS_Filter_Design_Test | q_Column_Names_Combo | Version | VER_ID | 7 |

Order of Columns
in DropDown List
(Combination)

Engagement Lead
Business Type
Engagement Name
Status
Status Date
ID
Version

Example 3

| | 1<br>DASHBOARD<br>NAME | 2<br>QUERY<br>NAME | 3<br>REPORT<br>COLUMN<br>NAME | 4<br>SORT<br>COLUMN<br>NAME | 5<br>ORDER<br>BY |
|---|---|---|---|---|---|
| 1 | DEMS_Filter_Design_Test | q_Column_Names_Combo | Business Type | BUSINESS_TYPE_NM | 2 |
| 2 | DEMS_Filter_Design_Test | q_Column_Names_Combo | Engagement Lead | ENGAGEMENT_LEAD | 1 |
| 3 | DEMS_Filter_Design_Test | q_Column_Names_Combo | Engagement Name | ENGAGEMENT_NM | 3 |
| 4 | DEMS_Filter_Design_Test | q_Column_Names_Combo | ID | ENG_ID | 6 |
| 5 | DEMS_Filter_Design_Test | q_Column_Names_Combo | Status | PROJECT_STATUS_NM | 4 |
| 6 | DEMS_Filter_Design_Test | q_Column_Names_Combo | Status Date | STATUS_EFF_DATE | 5 |
| 7 | DEMS_Filter_Design_Test | q_Column_Names_Combo | Version | VER_ID | 7 |

Order of Columns
in DropDown List
(Combination)

Engagement Name
Status
Status Date
Engagement Lead
Business Type
ID
Version

Example 1 results in columns being displayed in Alphabetical order. Example 2 results in columns being displayed in the order specified in the Order_By column with the order being determined by numbers 1 to 7. In example 3, the sequencing of first five was specified numerically, but the last two both got an order by value of 6 for both the "ID" and the "Version;" therefore, the first five are displayed based on Order by numeric designation, while the remaining entries are provided in alphabetical order.

Figure 9:
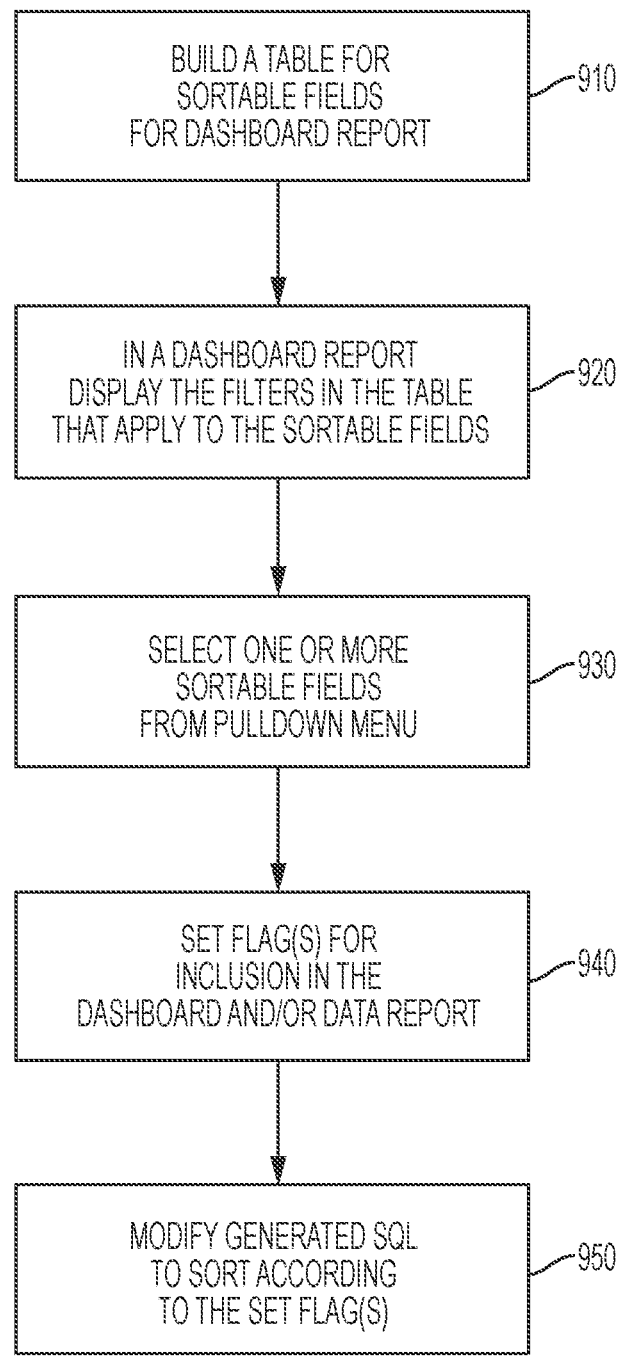
FIG. 9 illustrates a flowchart of steps to the to populate a customized pull down menu with table driven sort options in a graphical user interface for displaying a data report according to an embodiment of the present invention.

FIG. 9 illustrates a flowchart of steps to the to populate a customized pull down menu with table driven sort options in a graphical user interface for displaying a data report according to an embodiment of the present invention. As described above, the system 500 (see FIG. 5) first at step 910 builds a table of sortable fields for a dashboard report. Next, the system 500 at step 920 displays, in the dashboard report, filters in the table that apply to the sortable fields. At step 930; at least one sortable field is selected from the sortable fields from a pull down menu. Next, flags are set for inclusion in the dashboard report at step 940, wherein the flag(s) define a sort order for an element of the data report, and generated SQL is modified at step 950 to sort the element according to the flag(s) set at step 940 to thereby populate a customized pull down menu with table driven sort options in a graphical user interface.

It is further noted that filters may be added which include but are not limited to pre-defined filters and field-specific filters. Pre-defined filters are those that access some of the executable code that was developed by the user. Pre-defined filters include but are not limited to questions or prompts that the user would like to appear to the end user before the report is run that may require a complex calculation. Field-specific filters allow the user to control the results by placing parameters on specific fields in the reporting category, whether or not the user selected those fields for display in the reporting template.

Filters can be designated as mandatory (i.e. applicable every time the report is run) or optional. If a filter is designated as optional, the user will be able to edit the filter to turn the filter on or off when the user executes the report. If the filter is mandatory, the filter must be applied to the report for the report to run. Mandatory filters are useful to limit the date range for which a report can be run. Pulling all the data from a large amount of time may not be helpful to the user and may tax the system resources. Adding a filter to the report that requires the user to limit the data to a range of time could increase the usefulness of the report as well as the efficiency.

Filters may also be designated as static or dynamic. Dynamic filters allow the filter criteria to change each time the report is generated. When the report is run, the end user will be prompted for the new value. A quarterly report could use this type of filter and the user could enter the dates for the new quarter each time that the report is run. Static filters apply the same filter value each time the report is generated.

The user may optionally apply the same or different filters to the sub-reports than to the main report. Examples for the preset filters against the same base query could be: (1) the Cookie division of a company wants to see their orders for the last week for their top 100 stores; (2) the Soup division wants to see orders by sales rep in the last 30 days; (3) Management wants to see all orders summarized by division for the last year; and (4) a sales rep wants to see his sales quarter-to-date to see how the sales rep is doing against quota. All of these would be against the same data framework, but would modify the SQL based on the filters that were supplied preset filter selection.

For example, filters may allow for the same result set/dashboard/report as described above to be customized with filters for different uses. An example of this would be that a single query showing a company's opportunity pipeline could have one filter set that is used for a weekly cadence call to see where the sales representatives need assistance. The same query could have a different filter set to show management those deals that have been won, and a third set could be used to show planned versus actual reporting. The difference in these three reports would be the filtering of the status. This methodology becomes useful in reducing the workload to produce variants of the same report by adding a few rows to the filter table without any additional coding. The other value provide by this invention is the provision for consistent reports because the methodology eliminates human errors in cloning a report or setting the filters incorrectly.

Figure 10:
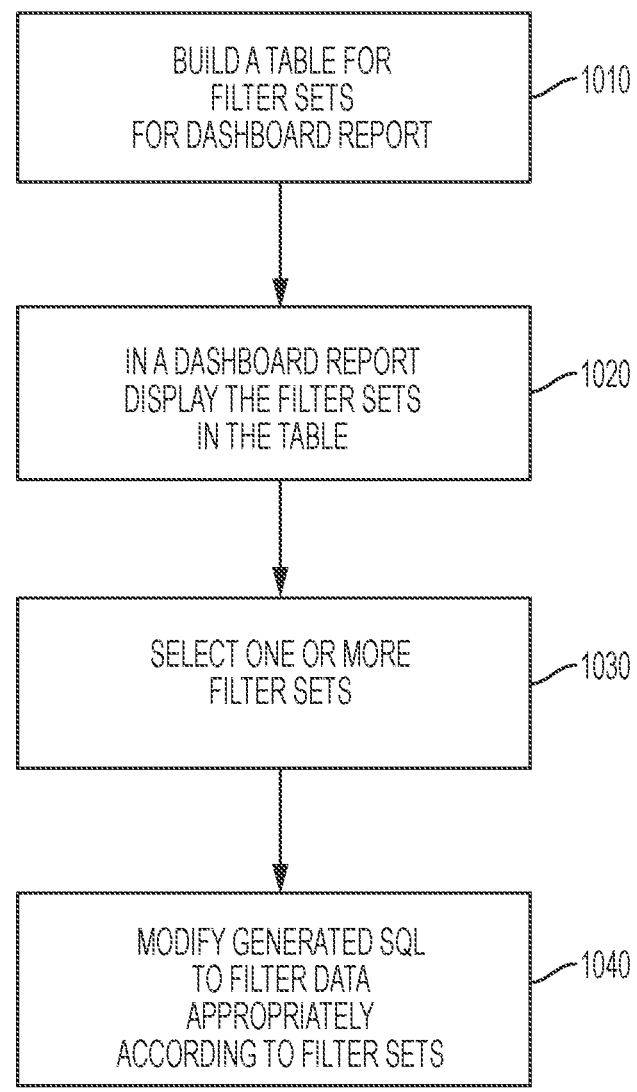
FIG. 10 illustrates a flowchart of step to filter data according to chosen filter sets using a modified generated SQL according to an embodiment of the present invention.

FIG. 10 illustrates a flowchart of step to filter data according to chosen filter sets using a modified generated SQL according to an embodiment of the present invention. As described herein, the system 500 (see FIG. 5) first at step 1010 builds a table of sortable fields for filter sets for a dashboard report. Next, the system 500 at step 1020 displays, in the dashboard report, filter sets in the table that apply to the fields. At step 1030; at least one filter is selected from the filter sets. Next, a generated SQL is modified at step 1040 to filter data according to the filter set(s) selected at step 1030 to thereby filter data to be displayed in a graphical user interface.

The new method could be implemented in two ways: a first embodiment would modify the generated SQL to produce a different result set based on filtering as defined in a related filter set table; and a second embodiment would be to return extra data in the original SQL to allow the filtering to occur on the client when a reporting tool is doing a federated join inside the tool itself.

The methodology starts with a database table that has a definition of preset filters which would typically be based on the data that is being returned. The table would contain the query name that is being executed, at least one filter set for each listed query, and the rules related for each query filter (e.g., please provide the deals with a win_date=current year written with appropriate syntax).

As the query is being prepared to execute, the system sees that the query has a filter set that was in the filter set table and was selected. The methodology would enable the filter lines to be inserted into the original base query. For the second embodiment, the filtering would take place in the reporting software as opposed to the database engine, and extra columns that would be needed in the result set to do the filtering would be added prior to execution. Using the example above, the query may insert the win date column into the SQL so that the win date column can be used in filtering. An additional modification relates to filters not being related to a specific data rule. In this instance, the filter could be to select only the rows with the top 10 dollar amounts.

Once the filters are established, the user can configure the appearance of the report. Configuration options include but are not limited to default sorting, grouping, column layout, descriptive report information, and output format. The user selects the default sorting of any data in the report. For example, the user may choose to sort by employee last name, but group the employees by office location. The user may select primary, secondary, tertiary, etc. sorting. The user may designate the order of the selected columns on the report. This user may enter information that will appear on the report, including but not limited to title and any other descriptive information that could be helpful for the end user. The user also selects the output format of the report, what type of file the report will appear in, including but not limited to MS Word, MS Excel, HTML, and/or PDF.

Once the user has completed development and design of a reporting template, the user may preview the report. The user may also save the report for use by end users.

While the user is designing a reporting template, in one embodiment of the invention, the system may alert the user as to how many records in the database the present configuration of the reporting template will retrieve. This real-time alert may guide the report development. For example, if the report template is listed as retrieving no results, the user may conclude that something faulty exists in the report design. This feature allows design issues to be flagged before the end user ultimately runs the report.

Showing the number of records without requiring the user to preview the report is advantageous because of the efficient use of human and technological resources. This topical view of the results can quickly alert the user to a design flaw without taxing the system by generating the report. Also, the generation of a report is slower that just pulling the number of records so the user does not have to sit and wait before realizing that the user made a programming error.

Although the functionality of the system and method for creating and generating custom reports over the Internet is disclosed with the user performing the steps in a particular order, those skilled in the art will appreciate numerous modifications therefrom, including but not limited to re-ordering the steps as a customization for a particular group of users.

It will be understood by those skilled in the art that the report template can be further customized by other users. Other users may configure optional filters. If an optional filter is established during the report design phase, the user can alter the data set that the report will display by entering different values into the filter. In the example of a date range optional filter, the user can enter a date range on a report, thereby limiting or pre-processing the data before the data is displayed in the final report by results valid only for that date range. The user can also disable the optional filter so no requirement for data entry exists.

The user can also affect the appearance of the data on the report when it is displayed or printed out. Depending on how a report is designed, grouping and/or sorting the results can be a complex undertaking and require major changes to the code.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additionally, it is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
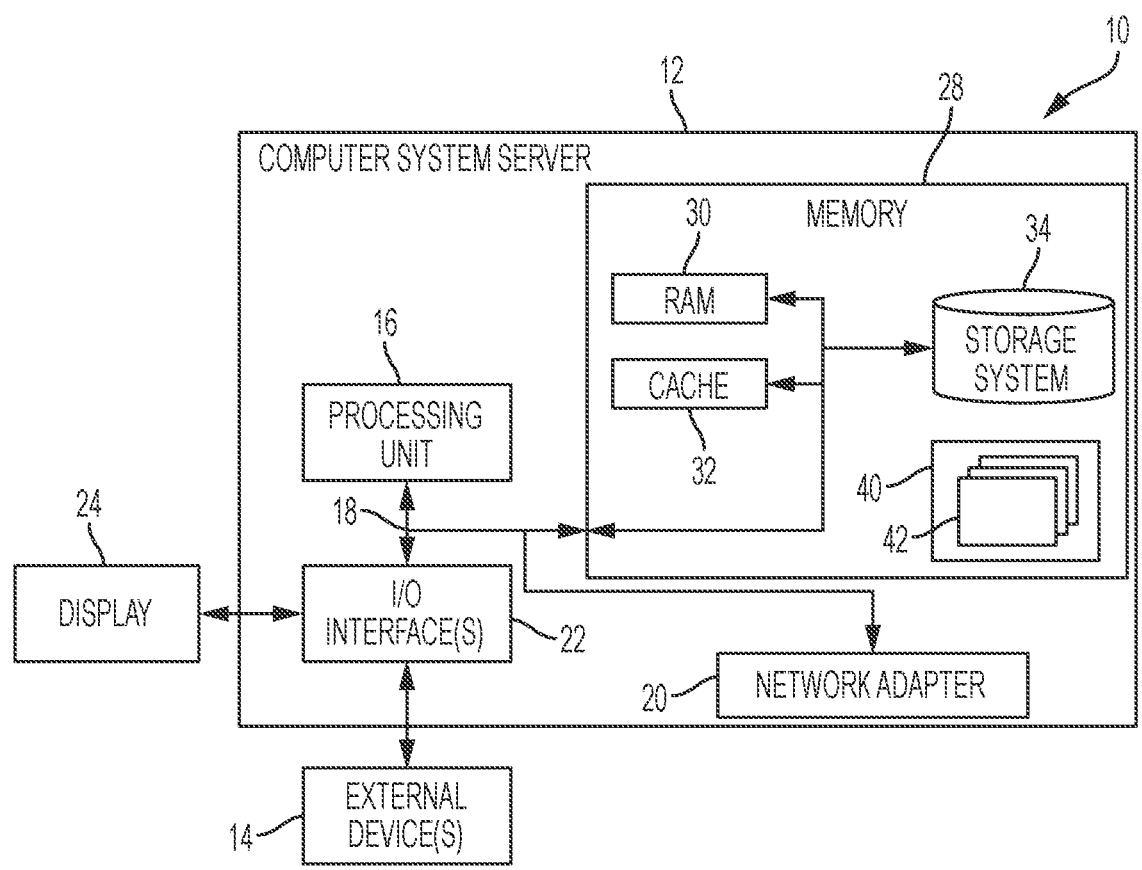
FIG. 11 depicts a cloud computing node according to an embodiment of the present invention.

Referring now to FIG. 11, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 12:
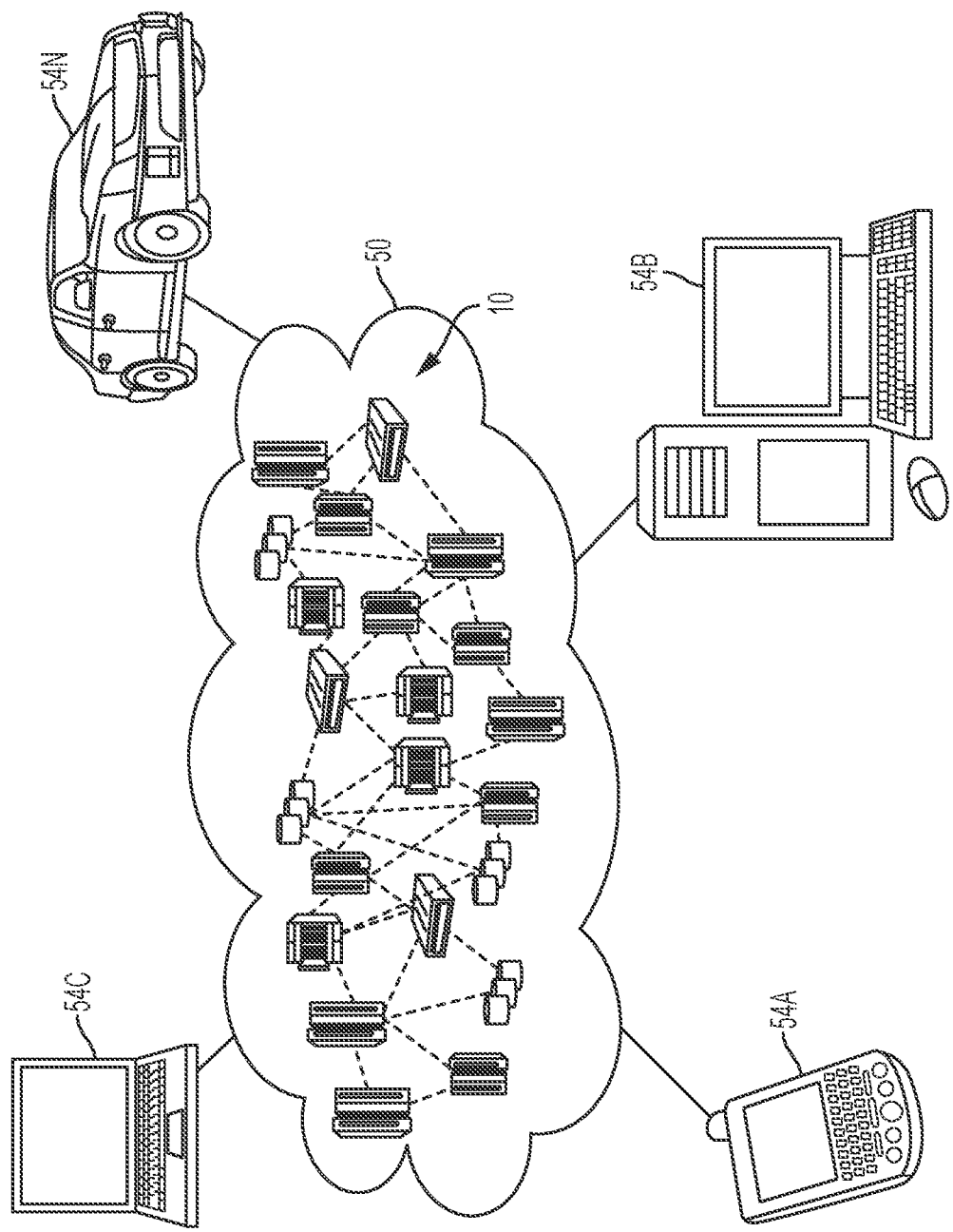
FIG. 12 depicts a cloud computing environment according to an embodiment of the present invention.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. The nodes may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 13:
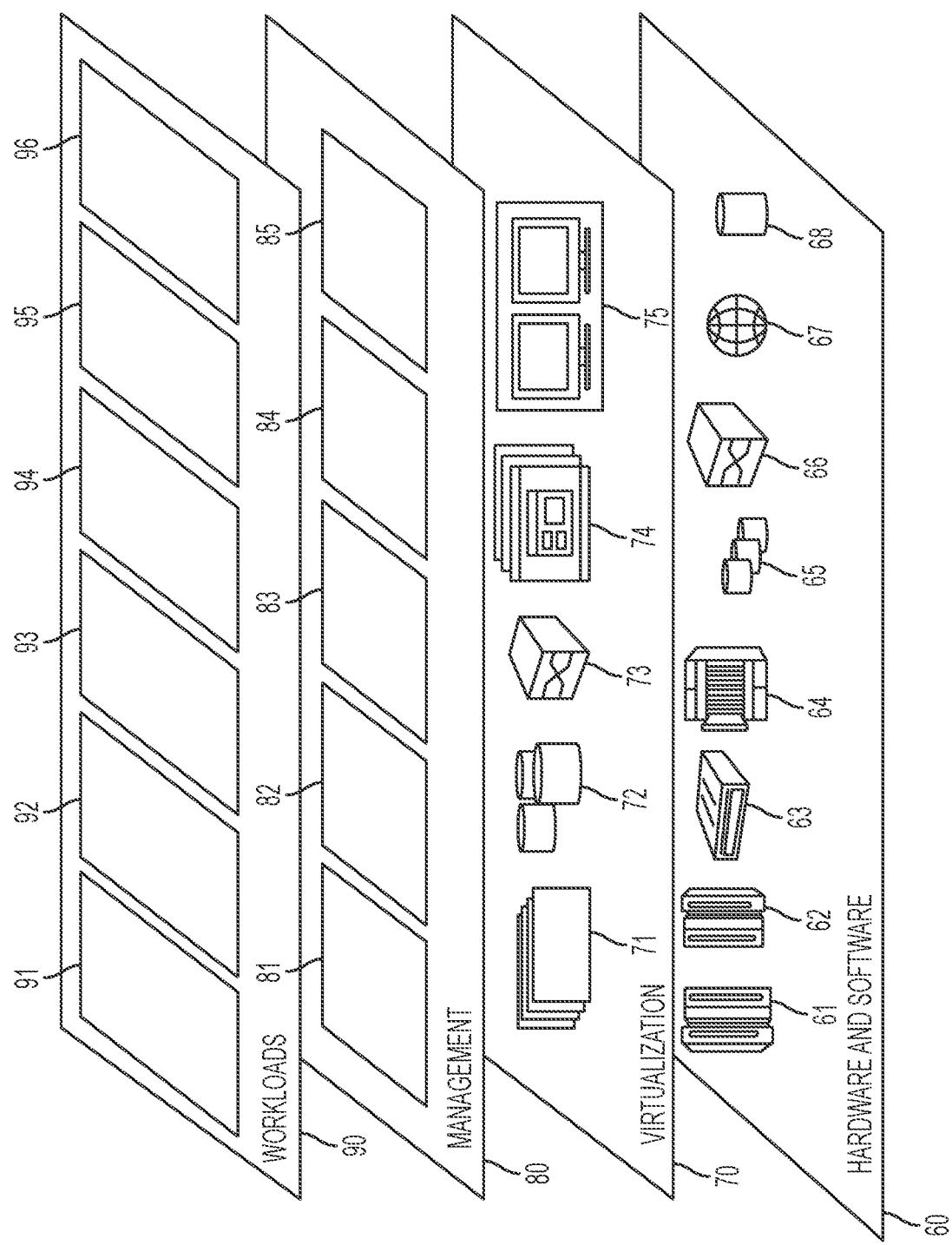
FIG. 13 depicts abstraction model layers according to an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system 96 or system 500 for sorting and/or filter according to the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

The claims are as follows:

1. A method to populate a customized pull down menu with table driven sort options in a graphical user interface for displaying a data report, comprising:

building, by a computer, a table of sortable fields for a dashboard report;

displaying in said dashboard report, by said computer, filters in said table that apply to said sortable fields;

receiving from a user, by the computer, a selection of at least one sortable field from said sortable fields from a pull down menu;

setting, by the computer, at least one sort option for inclusion in the dashboard report, said at least one set sort option defining a sort order for an element of said data report;

modifying, by the computer, a generated SQL statement to sort said element according to said at least one set sort option; and sorting, by the computer, said element according to said modified SQL statement.

2. The method of claim 1, further comprising:
building, by the computer, a filter table of filter sets for said dashboard report;
displaying in said dashboard report, by said computer, said filter sets in said table;
selecting, by the computer, at least one filter set from said filter table of filter sets; and
modifying, by the computer, said generated SQL to filter data according to said at least one filter set.

3. The method of claim 1, further comprising:
receiving, by the computer, a main query to obtain data for inclusion in a data report prior to said step of modifying.

4. The method of claim 1, further comprising:
establishing, by the computer, properties of a dropdown list including an option list property having a field value for a plurality of column names.

5. The method of claim 1, further comprising:
generating, by the computer, a data table including said plurality of column names comprising at least one sorting column for sorting said column names and at least one order column for specifying a user-defined order value; and
cross referencing said column names with user-defined order value for displaying said column names in a data report in a user-defined order, wherein said column names are provided in an order defined by said user-defined order entered by a user into said order column of said data table.

6. The method according to claim 5, wherein said user-defined order is arranged alphabetically.

7. The method according to claim 5, further comprising:
running said generated SQL utilizing said data table specifying said user-defined order for displaying said column names; and
generating said data report based on said generated SQL.

8. The method according to claim 5, further comprising integrating a sort option into the data table to enable a reporting tool to provide results in a predefined order by generating modified SQL code.

9. The method according to claim 8, further comprising:
displaying a sort options window including a drop down list of column names for specifying a sort sequence for said column names.

10. The method according to claim 5, further comprising:
including a time and date column in said data table for auditing changes made to said data table.

11. A computer program product comprising:
a computer-readable storage device; and
a computer-readable program code stored in the computer-readable storage device, the computer readable program code containing instructions executable by a processor of a computer system to implement a method to populate a customized pull down menu with table driven sort options in a graphical user interface for displaying a data report, the computer program product comprising:
building a table of sortable fields for a dashboard report;
displaying in said dashboard report filters in said table that apply to said sortable fields;
receiving from a user a selection of at least one sortable field from said sortable fields from a pull down menu;
setting at least one sort option for inclusion in the dashboard report, said at least one set sort option defining a sort order for an element of said data report;
modifying a generated SQL statement to sort said element according to said at least one set sort option; and
sorting said element according to a modified SQL statement.

12. The computer program product of claim 11, said computer program product further comprising:
building a filter table of filter sets for said dashboard report;
displaying in said dashboard report said filter sets in said table;
selecting at least one filter set from said filter table of filter sets; and
modifying said generated SQL to filter data according to said at least one filter set.

13. The computer program product of claim 11, said computer program product further comprising:
receiving a main query to obtain data for inclusion in a data report prior to said step of modifying.

14. The computer program product of claim 11, said computer program product further comprising:
establishing, by the computer, properties of a dropdown list including an option list property having a field value for a plurality of column names.

15. The computer program product of claim 11, said computer program product further comprising:
generating, by the computer, a data table including said plurality of column names comprising at least one sorting column for sorting said column names and at least one order column for specifying a user-defined order value; and
cross referencing said column names with user-defined order value for displaying said column names in a data report in a user-defined order, wherein said column names are provided in an order defined by said user-defined order entered by a user into said order column of said data table.

16. A computer system, comprising:
a processor;
a memory coupled to said processor; and
a computer readable storage device coupled to the processor, the storage device containing instructions executable by the processor via the memory to implement a method to populate a customized pull down menu with table driven sort options in a graphical user interface for displaying a data report, the computer system comprising the steps of:
building a table of sortable fields for a dashboard report;
displaying in said dashboard report filters in said table that apply to said sortable fields;
receiving from a user a selection of at least one sortable field from said sortable fields from a pull down menu;
setting at least one sort option for inclusion in the dashboard report, said at least one set sort option defining a sort order for an element of said data report;
modifying a generated SQL to sort said element according to said at least one set sort option; and
sorting said element according to a modified SQL statement.

17. The computer system of claim 16, said computer system further comprising:
building a filter table of filter sets for said dashboard report;
displaying in said dashboard report said filter sets in said table;
selecting at least one filter set from said filter table of filter sets; and modifying said generated SQL to filter data according to said at least one filter set.

18. The computer system of claim 16, said computer system further comprising:
   establishing properties of a dropdown list including an option list property having a field value for a plurality of column names.

19. The computer system of claim 16, said computer system further comprising:
   generating a data table including said plurality of column names comprising at least one sorting column for sorting said column names and at least one order column for specifying a user-defined order value; and
   cross referencing said column names with user-defined order value for displaying said column names in a data report in a user-defined order, wherein said column names are provided in an order defined by said user-defined order entered by a user into said order column of said data table.

* * * * *